P. R. WEITZEL.
MEANS FOR INDICATING LEVEL OF PLASTIC MATERIAL IN CONTAINERS.
APPLICATION FILED AUG. 20, 1919.
1,337,030.  Patented Apr. 13, 1920.
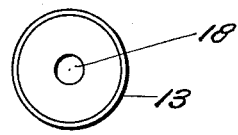
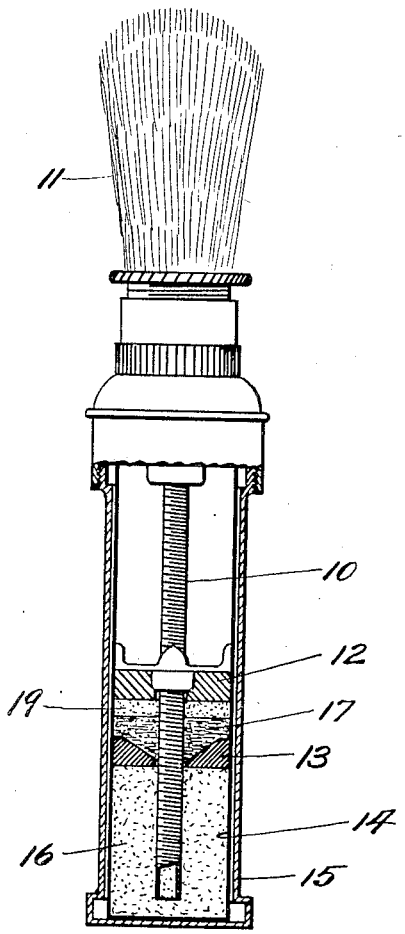
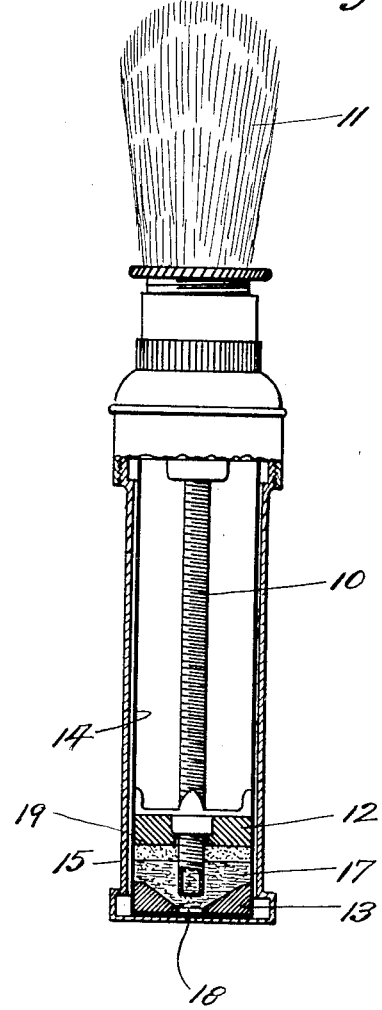
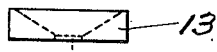
INVENTOR.
Paul R. Weitzel
BY William J. Jackson.
ATTORNEY.

UNITED STATES PATENT OFFICE.

PAUL R. WEITZEL, OF PHILADELPHIA, PENNSYLVANIA.

MEANS FOR INDICATING LEVEL OF PLASTIC MATERIAL IN CONTAINERS.

1,337,030.      Specification of Letters Patent.      Patented Apr. 13, 1920.

Application filed August 20, 1919. Serial No. 318,787.

*To all whom it may concern:*

Be it known that I, PAUL R. WEITZEL, a citizen of the United States, residing at the city of Philadelphia, county of Philadelphia, and State of Pennsylvania, have invented certain new and useful Means for Indicating Level of Plastic Material in Containers, of which the following is a specification.

The present invention relates to an improvement upon the invention disclosed in my application for Letters Patent serially numbered 293,039 filed April 26, 1919, and has for its principal object to provide definite means for spacing apart from the main layer of plastic material the layer which serves as a signal whereby during an expressing period the two layers are not intermingled. A further object is to provide a receptacle with main and auxiliary layers of plastic material having an intermediate layer for signal purposes whereby when the signal layer has been entirely expressed and the receptacle replenished, the auxiliary layer has become distributed throughout the receptacle parts so that the initial expression from the refilled receptacle is of the same character as is the main layer of plastic material. Other and further objects reside in the provision of certain combinations and arrangements of parts for attaining the foregoing results.

The invention consists of the improvements hereinafter described and finally claimed.

The nature, characteristic features and scope of the invention will be more fully understood from the following description taken in connection with the accompanying drawings forming part hereof, and in which:

Figure 1 is a view in elevation, partly sectioned, of a container or receptacle illustrating an embodiment of the present invention, the main layer of plastic material being partly expressed therefrom.

Fig. 2 is a similar view illustrating the main layer having been expressed and the signal layer in position for being expressed.

Fig. 3 is a top or plan view of a detail of construction hereinafter referred to; and Fig. 4 is an elevational view of Fig. 3.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

For the purposes of illustrating my invention I have shown in the drawings a receptacle or container comprising a lather or shaving brush although obviously the signaling means of the present invention is applicable to other containers. Referring to the drawings the hollow, screw-threaded stem 10, through which plastic material is fed to the bristles 11, is coöperatively provided with the usual follower-head 12 as is well understood in the art. Fitted loosely with respect to said stem, and spaced from said follower-head is a disk 13 of relatively dish-shaped contour made of suitable material as rubber. Such head and disk during an expressing period work through the cartridge 14 contained within the handle 15 of the lather brush. In loading the cartridge 14 the main layer 16 of plastic material, see Fig. 1, is caused to occupy the major portion thereof. The dished disk 13 is then placed upon such layer and the signal layer 17, which is possessed of distinct characteristics, is filled in upon such disk. The cartridge and handle 15 are then fitted to place the stem 10 passing through the aperture 18 of the disk 13. In this position the follower-head and disk are spaced apart and the chamber thus provided contains the signal layer of plastic material which is definitely separated from the main layer of material. With the complete expression of the main layer of material, see Fig. 2, the disk 13 drops to the bottom of cartridge 14, free of stem 10. Further expression of the receptacle contents feeds the signal layer to the bristles 11, said layer passing to the stem interior by reason of the dished contour of the disk 13. Of course all of the signal layer can not be expressed from the stem to the bristles so that when the cartridge is refilled the first expression is the remainder of the signal layer. This is a deceiving feature and to overcome such defect I prefer to superimpose upon the signal layer an auxiliary layer 19 of plastic material corresponding in characteristics to the main layer of material. Thus with the expression of all of the signal layer said auxiliary layer is distributed throughout the stem 10 so that when the receptacle is refilled the first expression of material corresponds to the main layer of material.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. An article of the character stated comprising a receptacle, plastic material composed of layers of distinct characteristics contained within the receptacle, means for definitely separating said layers to prevent intermingling during an expression period and means for expressing said material from said receptacle.

2. An article of the character stated comprising a receptacle, plastic material composed of layers of distinct characteristics contained within the receptacle, one of said layers being appreciably smaller than the other layer, means for definitely separating said layers to prevent intermingling during an expression period and means for expressing said material from said receptacle.

3. In combination a receptacle including a complemental screw-threaded hollow stem, a follower-head coöperatively secured with respect to said stem, a disk loosely mounted with respect to said stem and spaced from said follower-head, plastic material composed of layers of distinct characteristics contained within said receptacle one of said layers being accommodated between said follower-head and disk and means for operating said stem.

4. In an article of the character stated the combination of a receptacle, layers of plastic material contained within said receptacle of which the outer layer comprises main supply, the inner layer serves as an auxiliary to said main supply and the intermediate layer serves as a signal during expression to designate that the receptacle requires refilling, means for definitely separating the auxiliary and signal layers from the main layer to prevent intermingling during an expression period and means for expressing said plastic material from said receptacle.

In testimony whereof, I have hereunto signed my name.

PAUL R. WEITZEL.